United States Patent
Tamaki et al.

(10) Patent No.: US 12,450,321 B2
(45) Date of Patent: Oct. 21, 2025

(54) AUTHENTICATION SYSTEM FOR ELECTRONIC DEVICE

(71) Applicant: SEMICONDUCTOR ENERGY LABORATORY CO., LTD., Atsugi (JP)

(72) Inventors: Shigeru Tamaki, Kanagawa (JP); Kengo Akimoto, Kanagawa (JP); Hiromichi Godo, Kanagawa (JP); Koki Inoue, Kanagawa (JP); Yoshitaka Dozen, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 232 days.

(21) Appl. No.: 17/615,257

(22) PCT Filed: Jun. 9, 2020

(86) PCT No.: PCT/IB2020/055393
§ 371 (c)(1),
(2) Date: Nov. 30, 2021

(87) PCT Pub. No.: WO2020/254913
PCT Pub. Date: Dec. 24, 2020

(65) Prior Publication Data
US 2022/0237275 A1 Jul. 28, 2022

(30) Foreign Application Priority Data
Jun. 21, 2019 (JP) .................. 2019-115195

(51) Int. Cl.
*G06F 21/32* (2013.01)
*G06F 21/60* (2013.01)
*G06N 20/00* (2019.01)

(52) U.S. Cl.
CPC ............ *G06F 21/32* (2013.01); *G06F 21/604* (2013.01); *G06N 20/00* (2019.01)

(58) Field of Classification Search
CPC ........ G06F 21/32; G06F 21/604; G06N 20/00
See application file for complete search history.

(56) References Cited

U.S. PATENT DOCUMENTS 7,395,187 B2   7/2008  Duyanovich et al.
8,412,158 B2   4/2013  Forutanpour et al.
(Continued)

FOREIGN PATENT DOCUMENTS

CN   103168455 A     6/2013
JP   2010-044639 A   2/2010
(Continued)

OTHER PUBLICATIONS

International Search Report (Application No. PCT/IB2020/055393) Dated Aug. 18, 2020.
(Continued)

*Primary Examiner* — Jung W Kim
*Assistant Examiner* — Alan L Kong
(74) *Attorney, Agent, or Firm* — Nixon Peabody LLP; Jeffrey L Costellia

(57) ABSTRACT

An authentication system for an electronic device with a high security level is provided. The authentication system includes a data retention means that accumulates first data related to a state of the electronic device being used by a first user registered in advance and generates a first data group, a first authentication means that authenticates a second user operating the electronic device as the first user and releases a locked state, a data acquisition means that acquires second data related to a state of the electronic device being used by the second user in a state where the locked state is released, and a second authentication means that authenticates the
(Continued)

second user as the first user on the basis of the first data group and the second data and sets the electronic device to the locked state when the second user is not authenticated. The data retention means has a function of deleting the oldest first data of the plurality of pieces of the first data included in the first data group.

10 Claims, 7 Drawing Sheets

(56) References Cited

U.S. PATENT DOCUMENTS

| | | | |
|---|---|---|---|
| 9,038,167 B2* | 5/2015 | Fadell | G06F 21/316 726/19 |
| 9,342,677 B2* | 5/2016 | Ali | H04L 63/107 |
| 10,121,049 B2* | 11/2018 | Apostolos | G06V 40/1335 |
| 10,824,703 B1* | 11/2020 | Desai | G06V 40/70 |
| 11,039,005 B2* | 6/2021 | Huh | H04W 12/30 |
| 11,500,975 B2 | 11/2022 | Chen et al. | |
| 11,544,364 B2* | 1/2023 | Grover | G06V 40/1376 |
| 2012/0046012 A1 | 2/2012 | Forutanpour et al. | |
| 2014/0056493 A1 | 2/2014 | Gozzini | |
| 2015/0310444 A1* | 10/2015 | Chen | G06Q 20/308 705/44 |
| 2016/0292536 A1* | 10/2016 | Irie | G06V 40/172 |
| 2017/0263291 A1 | 9/2017 | Kurokawa | |
| 2018/0005566 A1 | 1/2018 | Kurokawa | |
| 2018/0039882 A1 | 2/2018 | Ikeda et al. | |
| 2018/0068098 A1 | 3/2018 | Finzi et al. | |
| 2018/0210561 A1 | 7/2018 | Shigemori et al. | |
| 2018/0225438 A1* | 8/2018 | Hama | G06V 40/28 |
| 2019/0005035 A1 | 1/2019 | Yamazaki et al. | |
| 2019/0044942 A1* | 2/2019 | Gordon | H03M 13/3972 |
| 2019/0220178 A1 | 7/2019 | Uwano | |
| 2020/0134152 A1* | 4/2020 | Chen | G06F 18/24143 |

FOREIGN PATENT DOCUMENTS

| | | |
|---|---|---|
| JP | 2010-170314 A | 8/2010 |
| JP | 2013-541076 | 11/2013 |
| JP | 2019-005305 A | 1/2019 |
| WO | WO-2012/024436 | 2/2012 |
| WO | WO-2019/004291 | 1/2019 |

OTHER PUBLICATIONS

Written Opinion (Application No. PCT/IB2020/055393) Dated Aug. 18, 2020.

* cited by examiner

AUTHENTICATION SYSTEM FOR ELECTRONIC DEVICE

TECHNICAL FIELD

One embodiment of the present invention relates to an electronic device. One embodiment of the present invention relates to an information terminal device. One embodiment of the present invention relates to an authentication system.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof. A semiconductor device generally means a device that can function by utilizing semiconductor characteristics.

BACKGROUND ART

In recent years, information terminal devices, for example, mobile phones such as smartphones, tablet information terminals, and laptop PCs (personal computers) have been widely used. Such information terminal devices often include personal information or the like, and thus various authentication technologies for preventing abuse have been developed.

For example, Patent Document 1 discloses an electronic device including a fingerprint sensor in a push button switch portion.

REFERENCE

Patent Document

[Patent Document 1] United States Published Patent Application No. 2014/0056493

SUMMARY OF THE INVENTION

Problems to be Solved by the Invention

An object of one embodiment of the present invention is to provide an authentication system for an electronic device with a high security level. Another object is to provide a user-friendly authentication system for an electronic device. Another object is to provide an authentication system for an electronic device which makes users feel less inconvenient. Another object is to provide an authentication system for an electronic device with high accuracy. Another object is to provide an authentication system for an electronic device which reduces the risk of personal information exposure.

Note that the description of these objects does not preclude the existence of other objects. One embodiment of the present invention does not have to achieve all these objects. Note that objects other than these can be derived from the description of the specification, the drawings, the claims, and the like.

Means for Solving the Problems

One embodiment of the present invention is an authentication system for an electronic device, which includes an authentication means, a data acquisition means, and a data retention means. The data retention means has a function of accumulating first data related to a state of the electronic device being used by a first user registered in advance and generating a first data group including a plurality of pieces of the first data. The data acquisition means has a function of acquiring second data related to a state of the electronic device being used by the second user operating the electronic device. The authentication means has a function of authenticating the second user as the first user on the basis of the first data group and the second data and a function of setting the electronic device to a locked state when the second user is not authenticated. The data retention means has a function of deleting the first data included in the first data group.

In the above, the authentication means preferably has a function of updating the first data group with use of the second data.

One embodiment of the present invention is an authentication system for an electronic device, which includes a first authentication means, a second authentication means, a data acquisition means, and a data retention means. The data retention means has a function of accumulating first data related to a state of the electronic device being used by a first user registered in advance and generating a first data group including a plurality of pieces of the first data. The first authentication means has a function of authenticating a second user operating the electronic device as the first user and a function of releasing a locked state of the electronic device when the second user is authenticated. The data acquisition means has a function of acquiring second data related to a state of the electronic device being used by the second user in a state where the locked state of the electronic device is released. The second authentication means has a function of authenticating the second user as the first user on the basis of the first data group and the second data and a function of setting the electronic device to the locked state when the second user is not authenticated. The data retention means has a function of deleting the oldest first data of the plurality of pieces of the first data included in the first data group.

In the above, the second authentication means preferably has a function of outputting the second data as one of the first data to the data retention means when the second user is authenticated.

In the above, the first data and the second data preferably include one or more of attitude information of the electronic device, information on a position of a hand touching the electronic device, and positional information.

In the above, the first data group preferably includes one or more of an activation history, an activation time, an operating time, setting information, and an operating history of application software and the order of starting two or more pieces of application software.

In the above, the second authentication means preferably has a function of authenticating the second user with use of anomaly detection. In this case, the second authentication means preferably has a function of authenticating the second user on the basis of inference using machine learning.

In the above, the first authentication means preferably includes any one or more of face authentication, fingerprint authentication, vein authentication, voiceprint authentication, iris authentication, cord input authentication, and pattern input authentication.

Effect of the Invention

According to one embodiment of the present invention, an authentication system for an electronic device with a high security level can be provided. A user-friendly authentication system for an electronic device can be provided. An authentication system for an electronic device which makes users feel less inconvenient can be provided. An authentication system for an electronic device with high accuracy can be provided. An authentication system for an electronic device which reduces the risk of personal information exposure can be provided.

Note that the description of these effects does not preclude the existence of other effects. One embodiment of the present invention does not need to have all these effects. Note that effects other than these can be derived from the description of the specification, the drawings, the claims, and the like.

MODE FOR CARRYING OUT THE INVENTION

Figure 1:
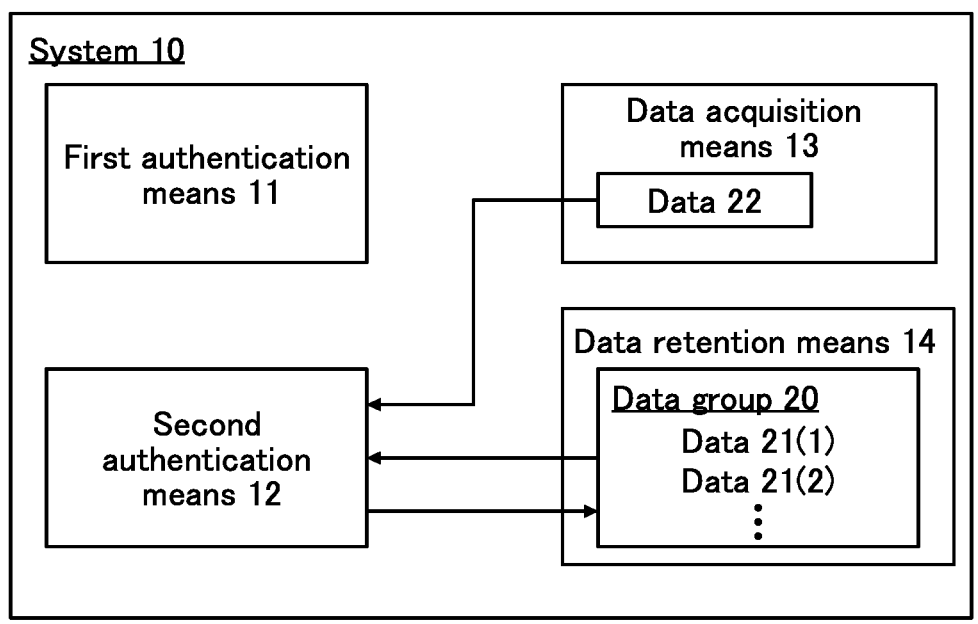
FIG. 1 is a diagram illustrating a structure example of a system.

Embodiments will be described below with reference to the drawings. Note that the embodiments can be implemented with many different modes, and it will be readily understood by those skilled in the art that modes and details thereof can be changed in various ways without departing from the spirit and scope thereof. Thus, the present invention should not be interpreted as being limited to the following description of the embodiments.

Note that in structures of the invention described below, the same portions or portions having similar functions are denoted by the same reference numerals in different drawings, and the description thereof is not repeated. Furthermore, the same hatch pattern is used for the portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, the ordinal numbers such as "first" and "second" are used in order to avoid confusion among components and do not limit the number.

Embodiment 1

In this embodiment, an electronic device and an authentication system for an electronic device are described.

Note that in the drawings attached to this specification, the block diagram in which components are classified according to their functions and shown as independent blocks is illustrated; however, it is difficult to separate actual components completely according to their functions, and one component may be related to a plurality of functions or a plurality of components may achieve one function.

Structure Example of System

FIG. 1 illustrates a block diagram of a system 10 of one embodiment of the present invention. The system 10 includes a first authentication means 11, a second authentication means 12, a data acquisition means 13, and a data retention means 14. The system 10 can be incorporated in an electronic device such as an information terminal device.

The first authentication means 11 verifies (also referred to as authenticates) whether a user operating the electronic device (also referred to as a second user) is a user registered in advance (a first user, also referred to as an authentic user) or not. The first authentication means 11 has a function of releasing the locked state of the electronic device when the first authentication means 11 verifies that the second user is the first user, i.e., can authenticate the second user.

Examples of authentication methods that can be applied to the first authentication means 11 include authentication methods employing user input such as password entry or pattern entry, authentication methods employing user's biological information (also referred to as biometric authentication) such as fingerprint authentication, vein authentication, voiceprint authentication, face authentication, and iris authentication, and the like.

The second authentication means 12 verifies whether the second user operating the electronic device is the first user registered in advance or not on the basis of a data group 20 retained in the data retention means 14 and data 22 acquired by the data acquisition means 13. The second authentication means 12 can also set the electronic device to the locked state when the second authentication means 12 verifies that the second user is not the first user.

The data acquisition means 13 has a function of acquiring the data 22 relating to the state of using the electronic device by the second user authenticated by the first authentication means 11 and a function of outputting the data 22 to the second authentication means 12.

As the data 22 acquired by the data acquisition means 13, a variety of kinds of information such as attitude information of the electronic device, information on the position of the hand or finger touching the electronic device, and positional information of the electronic device can be given.

Information on the tilt angle of the electronic device is typical of the attitude information of the electronic device. The tilt angle of the electronic device can be measured when an acceleration sensor is included as the data acquisition means 13.

Figure 2A:
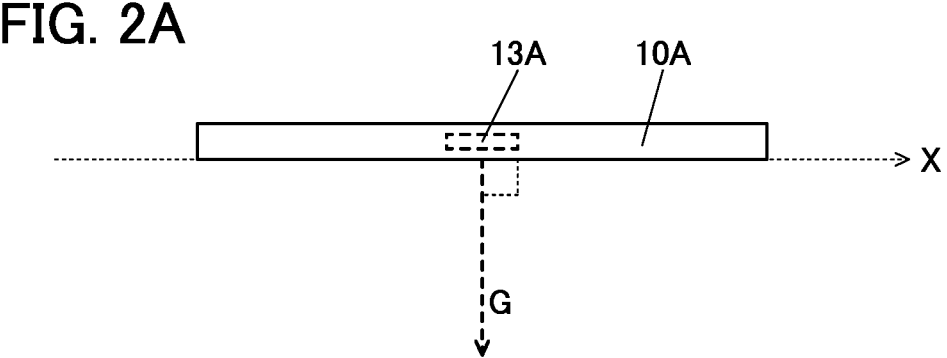
FIG. 2A to FIG. 2C are diagrams illustrating a method of measuring a tilt angle.
Figure 2B:
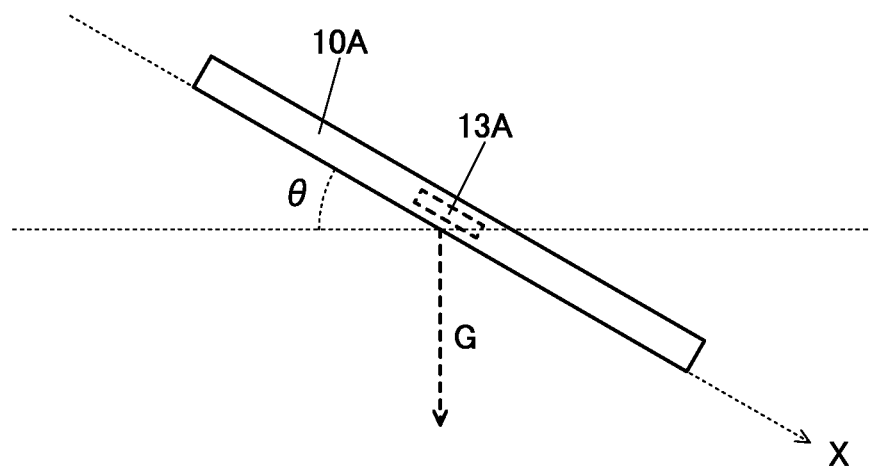

The method of measuring the tilt angle with the acceleration sensor is described using FIG. 2A and FIG. 2B. Here, a uniaxial tilt is mentioned for simplicity.

FIG. 2A and FIG. 2B are schematic views where an electronic device 10A including an acceleration sensor 13A is seen from the lateral direction. FIG. 2A and FIG. 2B illustrate the states where a gravitational acceleration G is applied to the electronic device 10A in the vertical direction. In the state illustrated in FIG. 2A, the electronic device 10A is held horizontally, and in the state illustrated in FIG. 2B, the electronic device 10A has been tilted by an angle θ from that in the state in FIG. 2A. It is assumed that acceleration other than the gravitational acceleration G is not applied to the electronic device 10A.

The acceleration sensor 13A is assumed to be capable of outputting an output value A[a] proportional to an acceleration a applied in the extending direction (X-direction) of the electronic device 10A. In the state illustrated in FIG. 2A, the acceleration is not applied in the horizontal direction and accordingly the output value is A[0].

Figure 2C:
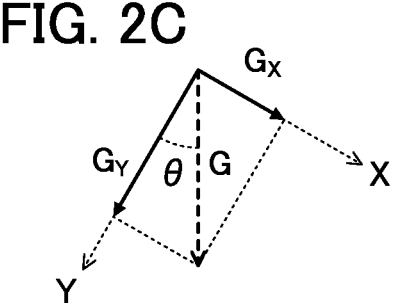

FIG. 2C is a schematic diagram where the gravitational acceleration G is decomposed into the extending direction (X-direction) and the thickness direction (Y-direction) of the electronic device 10A in the state illustrated in FIG. 2B. With the gravitational acceleration G, an acceleration $G_X$ applied in the X-direction and an acceleration $G_Y$ applied in the Y-direction are expressed by the following equations.

$$G_X = G \times \sin\theta \quad \text{[Formula 1]}$$
$$G_Y = G \times \cos\theta$$

Therefore, the output value $A[G_X]$ of the acceleration sensor 13A is determined by the angle θ. Moreover, by using the above equations, the tilt angle θ of the electronic device 10A can be calculated from the output value $A[G_X]$ of the acceleration sensor 13A.

The above is the description of the method of measuring the tilt angle with the acceleration sensor.

In the case where information on the position of the user's hand or finger touching the electronic device is used as the data 22 acquired by the data acquisition means 13, a housing or the like of the electronic device can be provided with a sensor that senses a touch of a hand or a finger, as the data acquisition means 13.

In the case where the positional information of the electronic device is used as the data 22, a receiver capable of receiving a GPS (Global Positioning System) signal can be used as the data acquisition means 13. Alternatively, as a method of acquiring the positional information of the electronic device, a method utilizing the positional information of access points to the wireless LAN (Local Area Network), a method by which the positional information is estimated from a distance between a mobile phone base station and the electronic device, or the like is used.

The moving speed of the electronic device can be used as the data 22. The moving speed can be estimated from a chronological change in positional information described above, for example. The moving speed can also be estimated with the use of the above acceleration sensor. Furthermore, a transport means of the user can be presumed from the moving speed. For example, the user is presumably walking if the estimated moving speed is approximately 5 km/h; the user is presumably running or riding a bike or the like if the estimated moving speed is approximately 10 km/h; and the user is presumably traveling by car, motor cycle, train, or the like if the estimated moving speed exceeds 30 km/h.

As the information that can be used as the data 22, a variety of kinds of information relating to the state of using the electronic device by the user can be utilized. Examples of the information include the activation time of the electronic device, the activation history of application software, the order of starting two or more pieces of application software, the time from activation to end of a specific piece of application software, the activation frequency of a specific piece of application software, and the like. As the data 22, information from which an individual can be identified can be used; examples of the information include information on volume setting for music or video reproduction, Internet browsing history information, search terms input to search engines, purchased items through the Internet shopping, transaction information through the Internet banking, and the like. The data 22 given as examples here can be acquired without using any special sensor device or the like as the data acquisition means 13.

As the information that can be used as the data 22, information relating to the user's information entry operations can also be utilized. Examples of the information include the speed of character entry operation on a touch panel, the speed of keyboard typing operation, input locus with a pointing device such as a mouse, a touch pad, a touch panel, or a stylus, and the like. Such information entry operations are information specific to the user and thus can be favorably used as the data from which an individual can be identified. At this time, a variety of input means described above can also serve as the data acquisition means 13.

The data retention means 14 has a function of holding the data group 20 composed of a plurality of pieces of data and a function of deleting old data included in the data group 20. The data retention means 14 can also be said to have a function of generating, managing, or updating the data group 20.

As illustrated in FIG. 1, the data group 20 includes a plurality of pieces of data (data 21(1), data 21(2), and the like). Note that in the following description, the pieces of data included in the data group 20 are collectively referred to as the data 21 when these pieces of data do not need to be distinguished from each other.

Each piece of the data 21 includes the data 22 acquired by the data acquisition means 13, and is data output from the second authentication means 12 to the data retention means 14. Time information is added to each piece of the data 22. Information on the time when data is acquired by the data acquisition means 13 is typical of the time information.

When time-series data is used as the data 22 acquired by the data acquisition means 13, specifically when a plurality of data elements acquired in a predetermined period is included and the acquisition times of the data elements are different from each other, the time information associated with the data 22 is preferably one. In this case, the data 22 preferably includes information on the acquisition times of each data element.

In FIG. 1, the data 21(1) included in the data group 20 refers to data to which a time t1 as the time information is added. Similarly, the data 21(2) refers to data to which a time t2 as the time information is added. Here, the time t1 is a time prior to the time t2; the larger the number of time is, the later the data to which the time is added is.

Into the data retention means 14, the data 21 input from the second authentication means 12 is newly added and accumulated. Here, the data retention means 14 preferably has a function of deleting the oldest data of the plurality of pieces of data 21 included in the data group 20.

Figure 3A:
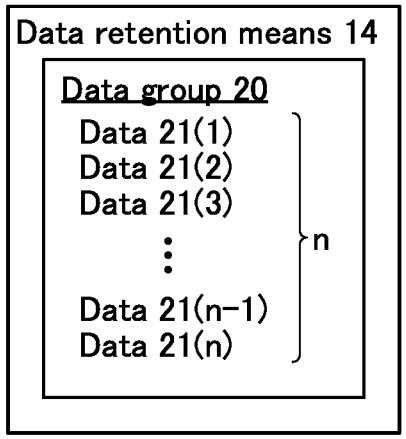
FIG. 3A to FIG. 3D are diagrams illustrating structure examples of a data retention means.

FIG. 3A schematically illustrates the data retention means 14 and the data group 20. As the data group 20, n pieces of data 21, the data 21(1) to data 21(n), are retained in the data retention means 14. Among then pieces of data 21, the data 21(1) is the oldest data and the data 21(n) is the latest data.

Figure 3B:
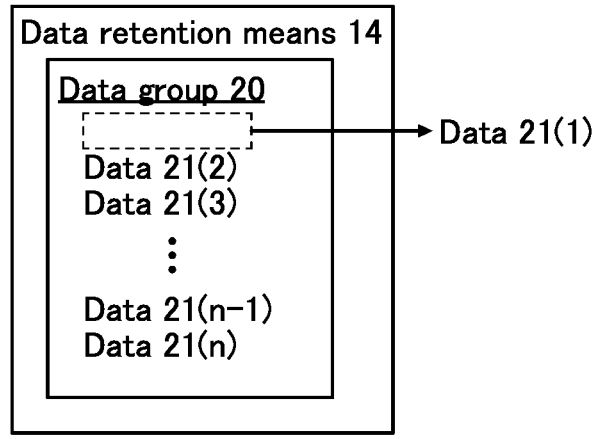

The data retention means 14 has a function of deleting the data 21 from the data group 20 after a certain period of time. FIG. 3B schematically illustrates a state where the data 21(1) is deleted from the data group 20. In this processing, at least the data 21(1) only has to be omitted from the data group 20, and the omitted data 21 may be erased from a memory device included in the data retention means 14 or the omitted data itself may be retained without being erased.

Figure 3C:
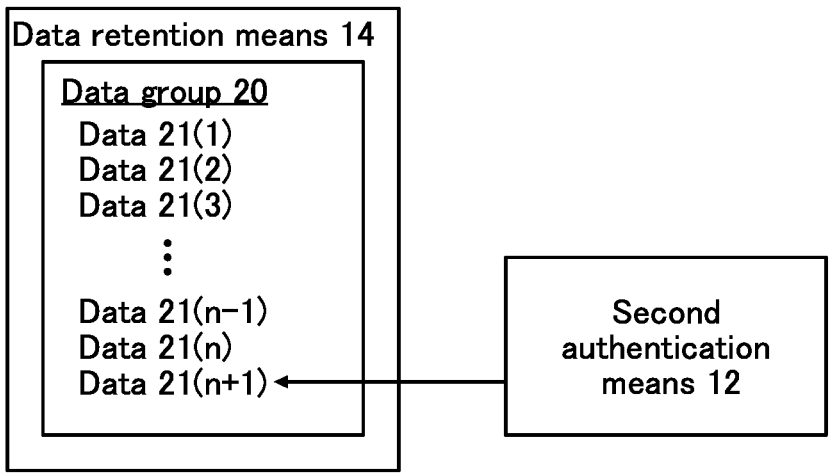

The data retention means 14 has a function of adding the data 21 input from the second authentication means 12 to the data group 20. FIG. 3C schematically illustrates a state where the data input from the second authentication means 12 is added as the latest data 21(n+1) to the data group 20.

The data 21 included in the data group 20 can be, for example, the data 21 in the past one year, the past half-year, the past three months, or the like. Although the data 21 older than that one or more years ago may be used, the data group 20 is preferably composed of the data 21 within one year in order to deal with changes in the first user's usage of the electronic device, behavior patterns, or the like. In particular, when the user is a child, such a change occurs more quickly as his/her growth, and thus fairly recent data (e.g., in the past three months) is preferably used as the data 21 included in the data group 20.

The number of pieces of data 21 included in the data group 20 affects the accuracy of the verification by the second authentication means 12, and therefore can be determined in consideration of the accuracy and the processing speed, depending on a method used for the verification by the second authentication means 12. For example, in the case where the second authentication means 12 performs anomaly detection based on a k-nearest neighbor method, the number of pieces of data 21 included in the data group 20 is preferably 100 or more, preferably 500 or more, further preferably 1000 or more so that the anomaly detection can be executed with high accuracy.

As the frequency of deletion of the data 21 by the data retention means 14, the data 21 is retained for a period longer than a predetermined period (e.g., one year) can be erased at any time, for example. When the data 21 is deleted at a higher frequency than the frequency at which it is added, the number of pieces of data 21 in the data group 20 is reduced and thus the deletion frequency may be decreased. By contrast, when the data 21 is added at a higher frequency than the frequency at which it is deleted, the number of pieces of data 21 in the data group 20 is increased and thus the deletion frequency can be increased. Here, if all pieces of the data 21 in the data group 20 is the latest data (e.g., within the last one week), the accuracy of authentication by the second authentication means 12 might be reduced. For this reason, when the data 21 is added at a higher frequency, for example, the number of pieces of data 21 included in the data group 20 is preferably adjusted by decimating the data instead of deleting the data in chronological order. Note that the frequency at which the data 21 is added can be controlled by the second authentication means 12.

Figure 3D:
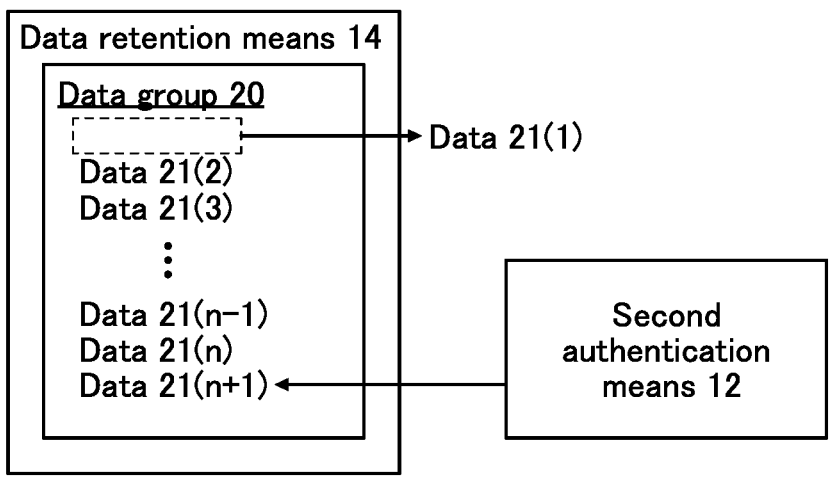

As illustrated in FIG. 3D, the data retention means 14 may operate so as to delete the oldest data 21(1) when data 21(n+1) is added from the second authentication means 12. In this manner, the data group 20 that includes the constant number of (here, n) pieces of data 21 is retained at any time in the data retention means 14, which makes adjustment of the number of pieces of data unnecessary and simplifies the processing.

Next, operation of the second authentication means 12 is described.

The second authentication means 12 performs a processing for authenticating the user (second user), who is authenticated by the first authentication means 11 and operating the electronic device (also referred to as an authentication processing). The authentication processing is performed using the data group 20 retained in the data retention means 14 and the data 22 acquired by the data acquisition means 13.

First, the authentication processing by the second authentication means 12 is described. The authentication processing by the second authentication means 12 preferably employs a technique of anomaly detection (also referred to as outlier detection). Techniques typical of anomaly detection are a detection method based on the distance between data points, a detection method based on the density of data, a detection method based on statistical distribution of data, a detection method based on the angle between data points, and the like. As the detection method based on the distance, a nearest neighbor method, a k-nearest neighbor method, a subspace method, and the like are given. As the detection method based on the density, a local outlier factor (LOF) method, an iForest (Isolation Forest) method, and the like are given. As the detection method based on statistical distribution, the Hotelling's $T^2$ method, a technique using mixture gaussian distribution, a kernel density estimation method, and the like are given. As the detection method based on the angle between data points, an ABOD (Angle Based Outlier Detection) method and the like are given. Another technique is a technique using a support vector machine (SVM). In particular, the One Class SVM is preferably used as the support vector machine.

The anomaly detection executed in the authentication processing by the second authentication means 12 may be performed by inference using machine learning. The anomaly detection is preferably performed by inference using a neural network, in particular. In the case where machine learning is used, the second authentication means 12 can include a learning model in which learning is performed using the data group 20. The second authentication means 12 can infer whether the data 22 is a normal value or an outlier on the basis of the value output when the data 22 is input to the learning model.

In the case of using machine learning, a new learning model is generated or updated using the data group 20 which has just been updated. Alternatively, the newly added data 22 may be used for enforced learning to update the learning model.

The case of anomaly detection by the k-nearest neighbor method is described below as an example. The plurality of pieces of data 21 included in the data group 20 and the data 22 are each regarded as a vector. The dimension of the vectors is determined in accordance with the data 21 and the data 22. For example, the data is regarded as a one-dimensional vector in the case of the above-described uniaxial tilt of the electronic device, and the data is regarded as a two-dimensional vector in the case of a biaxial tilt.

Next, given a sphere with the data 22 as the center and k pieces of data 21 (k is an integer greater than or equal to 1), the radius of the sphere can be assumed as an anomaly R1 of the data 22. The anomaly R1 may be a distance between the data 22 and the data 21 that is the k-th closest to the data 22. As the distance, although Euclid distance can be typically used, a suitable distance such as a normalized Euclid distance, a Mahalanobis Distance, a Manhattan distance, a Chebychev distance, or a Minkowski distance can be used in accordance with the kind of the data 22.

If the anomaly R1 of the data 22 calculated as above exceeds the threshold set in advance, the data 22 can be determined to be an outlier. In other words, the second authentication means 12 can verify that the second user operating the electronic device is not the first user registered in advance.

By contrast, if the anomaly R1 does not exceed the threshold, the data 22 can be regarded as a normal value because the determination as an outlier is not possible. In this case, the second authentication means 12 can verify that the second user is the first user.

The above is the description of the k-nearest neighbor method.

The above is the description of the authentication processing.

If the second authentication means 12 verifies that the second user is not the first user by the above authentication processing, the second authentication means 12 can set the electronic device to the locked state. By contrast, if the second authentication means 12 verifies that the second user is the first user, the login state of the electronic device is maintained.

When the login state of the electronic device is maintained, the second authentication means 12 may be kept in a standby state until the next data 22 is output from the data acquisition means 13. Alternatively, after a predetermined period of time has elapsed, the second authentication means 12 may require the data acquisition means 13 to acquire the data 22.

Furthermore, if the second authentication means 12 verifies that the second user is the first user by the above the authentication processing, the second authentication means 12 can output, as the latest data 21, the data 22 used in the authentication processing to the data retention means 14. Consequently, in the data group 20 retained in the data retention means 14, only the data 21 on the user authenticated by both the first authentication means 11 and the second authentication means 12 is included and there is no risk of mixing information on other users at any time, which enables the high-accuracy authentication to be maintained.

The above is the description of the second authentication means 12.

The functions of the first authentication means 11, the second authentication means 12, the data acquisition means 13, and the data retention means 14 that are included in the system 10 may be partly achieved by a server or the like provided separately from the electronic device. Particularly in the case where the scale of operation by the first authentication means or the second authentication means is large, data is transmitted to an external server through a network and part of the arithmetic operation is executed by the server, which can reduce the scale of operation by the first authentication means or the second authentication means.

In particular, the processing by the first authentication means 11, the second authentication means 12, the data acquisition means 13, and the data retention means 14 illustrated in FIG. 1 is preferably completed within one electronic device. Since information for specifying or identifying an individual is included in the data 22 or the data group 20, transmission of the information through a network to the outside increases the risk of improper use of the data. Hence, completion of the processing within one electronic device leads to an authentication system with an extremely high security level. Note that there is no limitation on the processing in one electronic device, and data transmission may occur between a plurality of electronic devices connected to a personal home network or between electronic devices in a local network of a company or the like.

Operation Example of System 10

Figure 4:
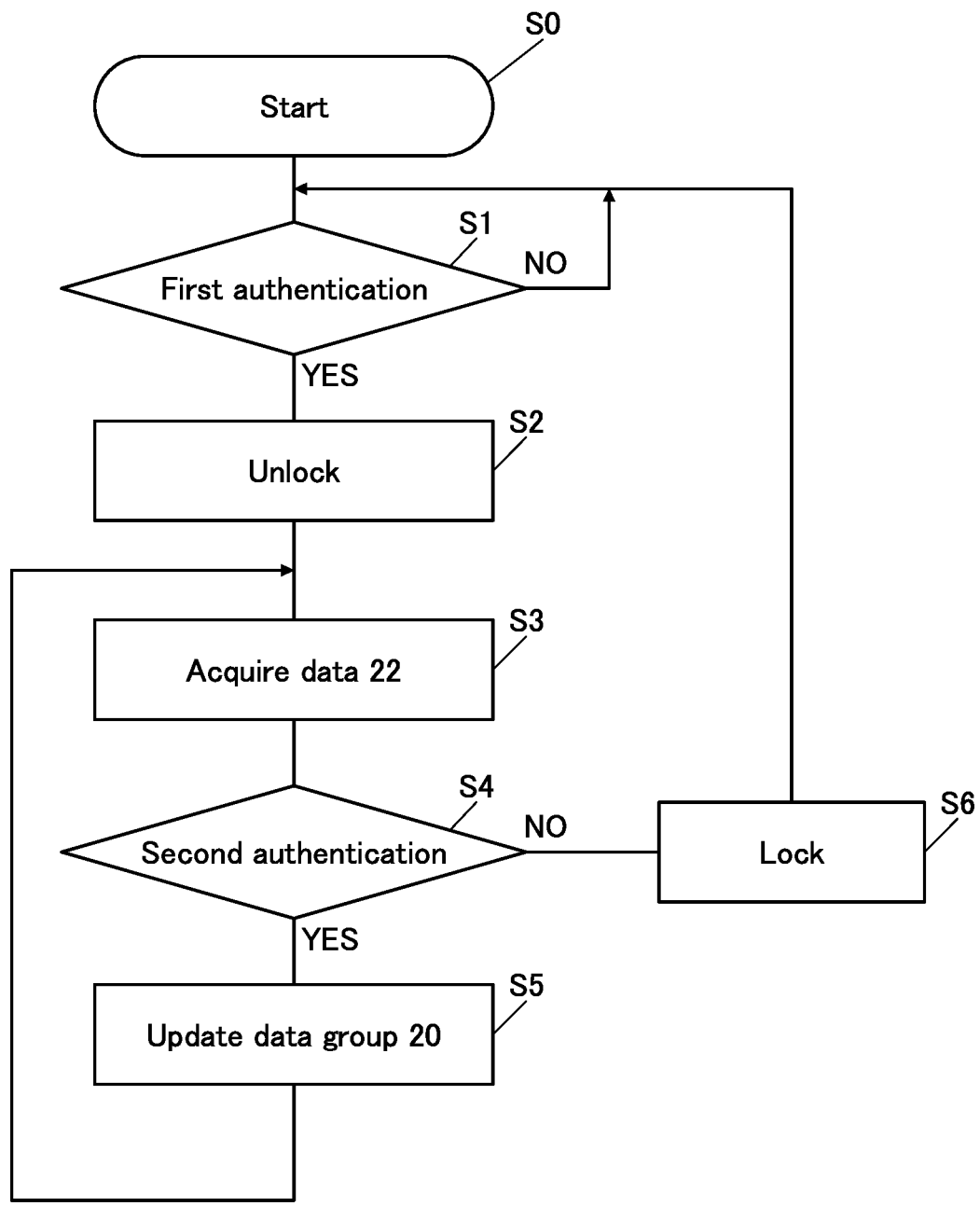
FIG. 4 is a flow chart illustrating an operation of a system.

An operation example of the above system 10 is described below. FIG. 4 is a flow chart of the operation of the system 10. The flow chart shown in FIG. 4 includes Step S0 to Step S6.

In Step S0, the operation starts. The operation starts when power-on of an electronic device, a touch on a display portion, a change in the attitude of the electronic device, or the like is sensed, for example. At this time, the electronic device is in the locked state.

In Step 1, the first authentication means 11 performs an authentication processing (first authentication). If the user is authenticated, the processing proceeds to Step S2. If the user is not authenticated, the processing returns to Step S1 while the electronic device remains in the locked state.

In Step S2, the locked state of the electronic device is released, and the system is logged in.

In Step 3, the data acquisition means 13 acquires the data 22. In accordance with the request from the second authentication means 12, the data acquisition means 13 can output the acquired data 22 to the second authentication means 12.

In Step S4, the second authentication means 12 performs an authentication processing (second authentication). If the user is authenticated, the processing proceeds to Step S5. If the user is not authenticated, the processing returns to Step S6.

In Step S5, the second authentication means 12 outputs the data 22 used in the authentication, as one piece of data 21, to the data retention means 14. The data retention means 14 updates the data group 20 on the basis of the newly input data 21.

In Step S5, the data retention means 14 may update the data group 20 by deleting the old data 21 from the data group 20. The timing of deletion of the data 21 is not limited to Step S5. The data 21 may be periodically deleted at predetermined timings (e.g., once a day or once a week), or the data 21 may be deleted at the timing after a predetermined period on the basis of the time information of the data 21.

In Step S5, whether the data group 20 is updated or not is preferably controlled by the second authentication means 12. In other words, there may be the case where the data 22 used in the authentication is not retained in the data retention means 14 and the data group 20 is not updated. For example, if the data 22 is frequently acquired by the data acquisition means 13 and the data group 20 in the data retention means 14 is updated every time the data 22 is acquired, new data might account for an excessive proportion of the plurality of pieces of data 21 in the data group 20. Thus, the frequency of updating of the data group 20 is preferably adjusted by the second authentication means 12 on the basis of the time information of each piece of data 21 included in the data group 20.

After the updating of the data group 20 is completed in Step S5, the processing proceeds to Step S3. In this manner, the authentication processing by the second authentication means 12 can be repeated during the period when the electronic device is used. This enables extremely high-accuracy user authentication. Moreover, since acquisition of the data 22 by the data acquisition means 13 is also repeated, the number of pieces of data 21 accumulated in the data group 20 can be increased, which leads to an increase in the accuracy of the authentication processing by the second authentication means 12.

If the use is not authenticated in Step S4, the electronic device is set to the locked state and the system is logged off in Step S6. This renders the electronic device unavailable to the second user operating the electronic device. After that, the processing proceeds again to Step S1.

The above is the description of the flow chart illustrated in FIG. 4.

Figure 5:
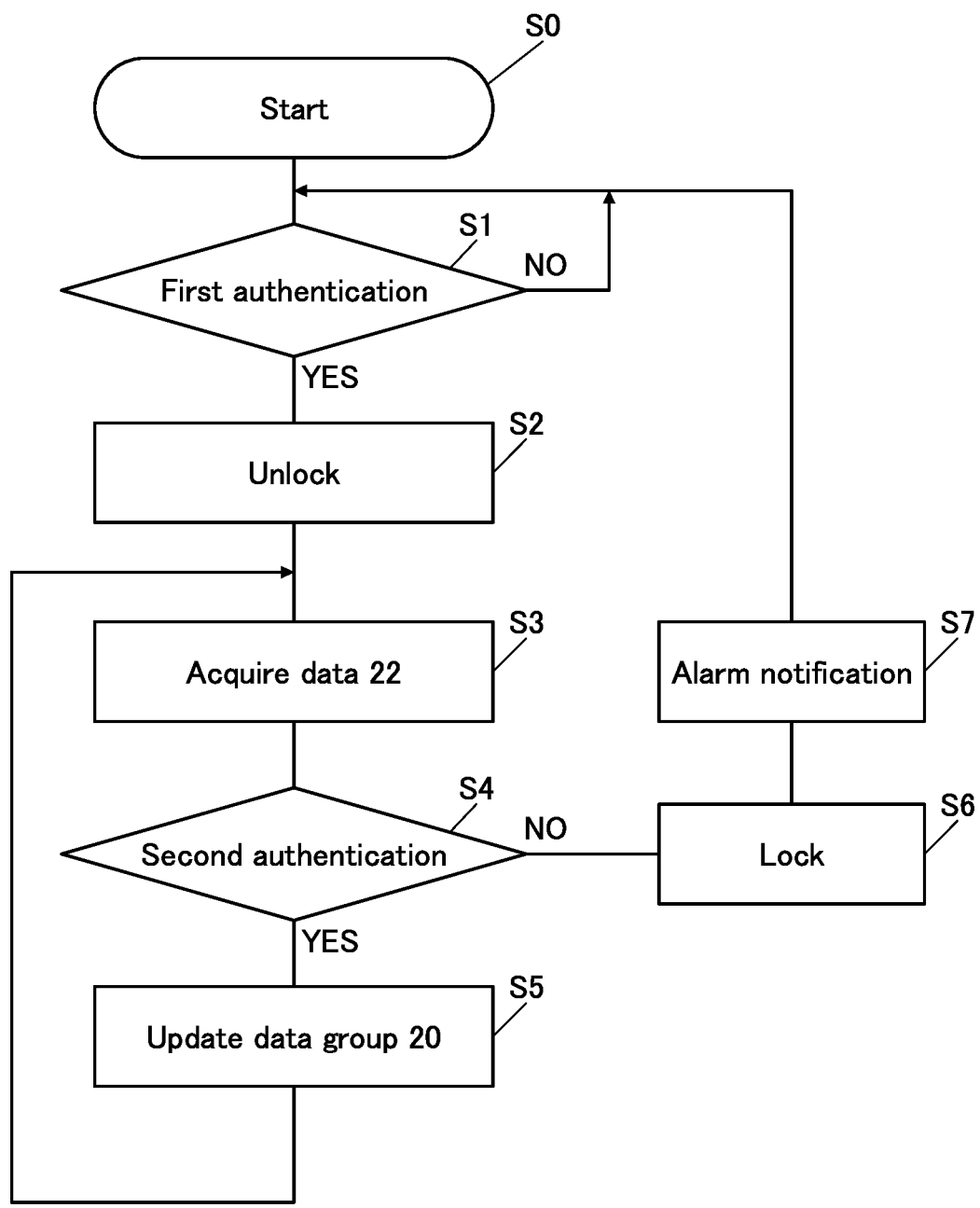
FIG. 5 is a flow chart illustrating an operation of a system.

Here, as illustrated in FIG. 5, the processing may proceed to Step S7 after Step S6. In Step S7, the first user registered in advance is notified of the possibility of abuse of the electronic device (alarm notification).

For example, the alarm notification employs a variety of methods, such as a method of displaying the notification on other electronic device possessed by the first user and a method of transmitting a message of text, sound, video, or the like to e-mail address, an SNS account, or the like registered in advance. Preferably, the alarm notification can be preset so that not only the first user but also electronic device vendors, telecommunication carriers, the police, and the like are notified.

Preferably, at the same time as the alarm notification, notification is given of the positional information of the electronic device. Preferably, notification is also given of information on the usage history of the electronic device (e.g., transaction conditions of purchases, financial transactions, or the like through the Internet).

The above is the description of the operation example of the system.

Specific Example

A specific example of the case of using an electronic device, to which the authentication system of one embodiment of the present invention is applied, is described below.

Figure 6A:
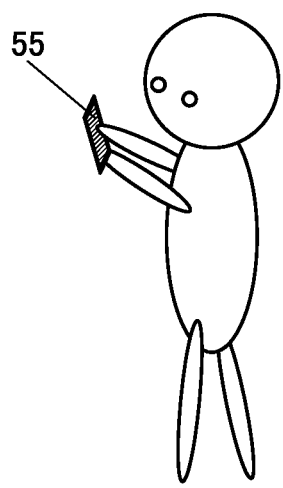
FIG. 6A to FIG. 6E are diagrams each illustrating a use example of an electronic device.

FIG. 6A illustrates a state where a user 50 operates an electronic device 55. The authentication system of one embodiment of the present invention is applied to the electronic device 55. The user 50 is the owner of the electronic device 55 and registered in the authentication system in advance.

Figure 6B:
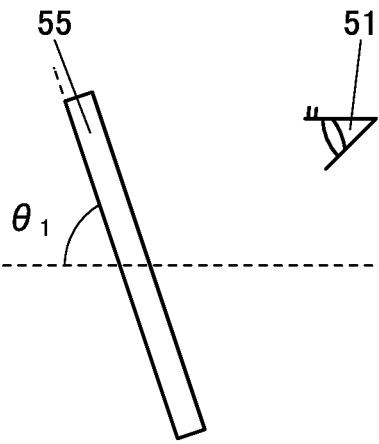

FIG. 6B schematically illustrates a tilt $\theta_1$ of the electronic device 55 and the position of an eye 51 of the user 50 when the electronic device 55 is used by the user 50.

Figure 6C:
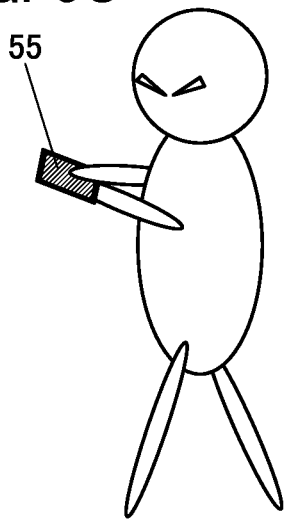

FIG. 6C illustrates a state where a malicious user 50X operates the electronic device 55. The user 50X is different from the user 50 in stature (appearance) such as height or shape.

Figure 6D:
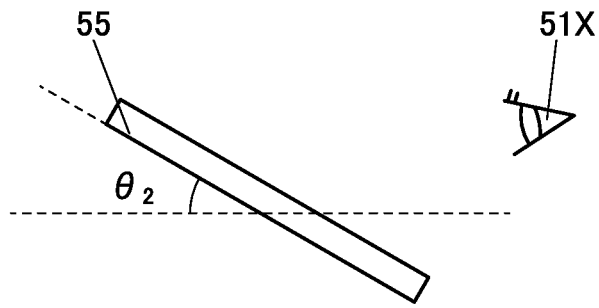

FIG. 6D schematically illustrates a tilt $\theta_2$ of the electronic device 55 and the position of an eye 51X of the user 50X when the electronic device 55 is used by the user 50X. The tilt $\theta_2$ is smaller than the tilt $\theta_1$, which reveals that the user 50X uses the electronic device 55 in a more horizontal attitude than the user 50. It is found that the user 50X is different from the user 50 also in the distance between the eye and the electronic device 55. The distance can be measured by, for example, a ranging method using infrared light or the like.

Since the authentication system of one embodiment of the present invention is applied to the electronic device 55, even if the user 50X breaks the first authentication in the electronic device 55 by a malicious means, the electronic device 55 can be immediately set to the locked state by detecting the tilt $\theta_2$ of the electronic device 55, the distance between the electronic device 55 and the eye 51X, or the like and verifying that the user 50X using the device is different from the user 50. The user 50X is immediately blocked despite a number of breakdowns of the first authentication, and consequently the authentication system can make the user 50X give up abuse.

Figure 6E:
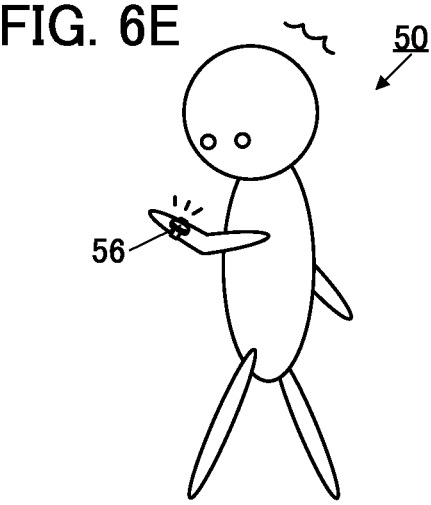

As illustrated in FIG. 6E, notification to a wearable device 56 can let the user 50 know the possibility that someone might attempt abusing the electronic device 55. The user 50 can confirm the positional information of the electronic device 55 or the like with the wearable device 56 and quickly respond by, for example, contacting the telecommunication carrier to make the electronic device unavailable or contacting the police.

Although the example in which an abuse is detected from the tilt of the electronic device 55 and the distance between an eye and the electronic device 55 is described here, the present invention is not limited to this and the above-described various kinds of information can be used. For example, by acquisition of the positional information of the electronic device 55, an abuse can also be suspected when the use of the electronic device 55 continues for a certain period of time in a place outside the usual activity area of the user 50.

Preferably, the user authentication is compositely performed using two or more kinds of information (e.g., two kinds of information: information on the tilt of the electronic device and the positional information of the electronic device). The kinds of information used to specify the user are preferably large in number, in which case the accuracy of the user authentication can be increased. For example, even when the electronic device is used in a place different from the usual activity area, such as the case where the owner of the electronic device takes a trip, the user authentication using other information can avoid a misdetection and high security level can be maintained without rendering the user stressful.

The above is the description of the specific example.

The authentication system of one embodiment of the present invention can utilize the authentic user's practice, habit, behavior, or the like in use of the electronic device, which makes an abuse of the electronic device difficult and offers extremely high security level. In addition, even if any other malicious user breaks the first authentication by a malicious means and releases the locked state, the electronic device can be immediately set to the locked state without giving the time for an abuse to the malicious user. Furthermore, since the authentic user and the like can be immediately notified of the malicious user's attempt to use the electronic device, the authentic user can take quick responses. When the second authentication processing is executed, the system does not require the user to do any operation for the authentication, so that the authentic user can continue to use the electronic device without any awareness and rarely feel stressful.

At least part of this embodiment can be implemented in combination with the other embodiment described in this specification as appropriate.

Embodiment 2

In this embodiment, an example of a hardware structure of an information processing device which can achieve the authentication system of one embodiment of the present invention is described. The electronic device exemplified in Embodiment 1 is one mode of the information processing device exemplified below.

Figure 7:
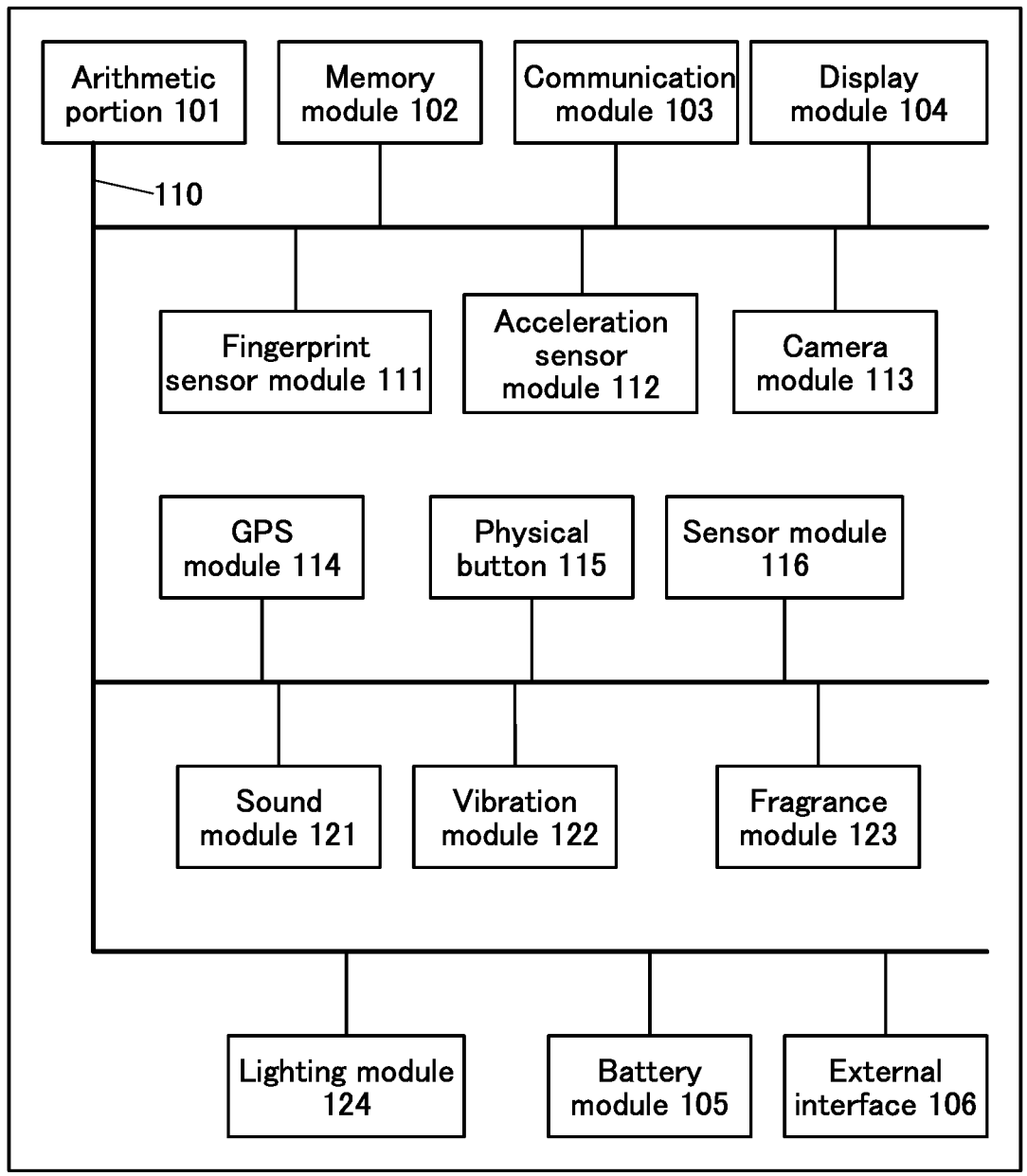
FIG. 7 is a diagram illustrating a structure example of an information processing device.

FIG. 7 is a block diagram of the information processing device 100 exemplified below. The information processing device 100 includes an arithmetic portion 101, a memory module 102, a communication module 103, a display module 104, a fingerprint sensor module 111, an acceleration sensor module 112, a camera module 113, a GPS module 114, a physical button 115, a sensor module 116, a sound module 121, a vibration module 122, a fragrance module 123, a lighting module 124, a battery module 105, an external interface 106, and the like.

Note that the information processing device 100 can display an image using the display module 104 and thus can be called an image display device.

For simple description, in the case where components other than the arithmetic portion 101 included in the information processing device 100 are not distinguished from each other, each component is referred to as a component or a module in some cases.

The information processing device 100 does not necessarily include all the components illustrated in FIG. 7 and may include any component other than the components illustrated in FIG. 7.

Each component is connected to the arithmetic portion 101 through the bus line 110.

The function of the first authentication means 11 in Embodiment 1 can be achieved by one or more of the arithmetic portion 101, the memory module 102, the fingerprint sensor module 111, the camera module 113, the physical button 115, the sensor module 116, and the like. The function of the second authentication means 12 can be achieved by the arithmetic portion 101, the memory module 102, and the like. The function of the data acquisition means 13 can be achieved by one or more of the acceleration sensor module 112, the camera module 113, the GPS module 114, the physical button 115, the sensor module 116, the sound module 121, and the like. The function of the data retention means 14 can be achieved by the arithmetic portion 101, the memory module 102, and the like.

The arithmetic portion 101 can function as, for example, a central processing unit (CPU). The arithmetic portion 101 has a function of controlling components.

Signals are transmitted between the arithmetic portion 101 and the components via the bus line 110. The arithmetic portion 101 has a function of processing signals input from the components which are connected via the bus line 110, a function of generating signals to be output to the components, and the like, so that the components connected to the bus line 110 can be controlled comprehensively.

Note that a transistor that includes an oxide semiconductor in a channel formation region and that achieves an extremely low off-state current can be used in an IC or the like included in the arithmetic portion 101 or another component. Since the transistor has an extremely low off-state current, the transistor is used as a switch for holding electric charge (data) which flows into a capacitor functioning as a memory element, whereby a long data retention period can be ensured. Utilizing this characteristic for a register or a cache memory of the arithmetic portion 101 enables normally-off computing where the arithmetic portion 101 operates only when needed and data on the previous processing is stored in the memory element in the other case; thus, power consumption of the information processing device 100 can be reduced.

The arithmetic portion 101 interprets and executes instructions from various programs with the use of a processor to process various kinds of data and control programs. Programs that might be executed by the processor may be stored in a memory region of the processor or may be stored in the memory module 102.

A CPU and other microprocessors such as a DSP (Digital Signal Processor) and a GPU (Graphics Processing Unit) can be used alone or in combination as the arithmetic portion 101. A structure may be employed in which such a microprocessor is obtained with a PLD (Programmable Logic Device) such as an FPGA (Field Programmable Gate Array) or an FPAA (Field Programmable Analog Array).

The arithmetic portion 101 may include a main memory. The main memory can have a structure in which a volatile memory such as a RAM (Random Access Memory) or a nonvolatile memory such as a ROM (Read Only Memory) is provided.

For example, a DRAM (Dynamic Random Access Memory) is used for the RAM provided in the main memory, in which case a memory space as a workspace for the arithmetic portion 101 is virtually allocated and used. An operating system, an application program, a program module, program data, and the like which are stored in the memory module 102 are loaded into the RAM to be executed. The data, program, and program module which are loaded into the RAM are directly accessed and operated by the arithmetic portion 101.

Meanwhile, a BIOS (Basic Input/Output System), firmware, and the like for which rewriting is not needed can be stored in the ROM. As the ROM, a mask ROM, an OTPROM (One Time Programmable Read Only Memory), an EPROM (Erasable Programmable Read Only Memory), or the like can be used. Examples of the EPROM include a UV-EPROM (Ultra-Violet Erasable Programmable Read Only Memory) which can erase stored data by ultraviolet irradiation, an EEPROM (Electrically Erasable Programmable Read Only Memory), and a flash memory.

The arithmetic portion 101 preferably includes a processor specialized for parallel arithmetic operation as compared with a CPU. For example, a processor including a large number of (several tens to several hundreds of) processor cores capable of parallel processing, such as a GPU, a TPU (Tensor Processing Unit), or an NPU (Neural Processing Unit), is preferably included. Accordingly, the arithmetic portion 101 can especially perform arithmetic operation by a neural network at high speed.

As the memory module 102, a memory device using a nonvolatile memory element, such as a flash memory, an MRAM (Magnetoresistive Random Access Memory), a PRAM (Phase change RAM), an ReRAM (Resistive RAM), or an FeRAM (Ferroelectric RAM); a memory device using a volatile memory element, such as a DRAM (Dynamic RAM) or an SRAM (Static RAM); or the like may be used, for example. Furthermore, a memory media drive such as a hard disk drive (HDD) or a solid state drive (SSD) may be used, for example.

A memory device that can be connected and disconnected to the external interface 106 through a connector, such as an HDD or an SSD, or a media drive for a recording medium such as a flash memory, a Blu-ray disc, or a DVD can be used as the memory module 102. Note that the memory module 102 is not incorporated in the information processing device 100, and a memory device located outside may be used as the memory module 102. In that case, the memory device may be connected through the external interface 106, or data transmission and reception may be wirelessly performed using the communication module 103.

The communication module 103 can perform communication via an antenna. For example, the communication module 103 controls a control signal for connecting the information processing device 100 to a computer network in response to instructions from the arithmetic portion 101 and transmits the signal to the computer network. Accordingly, communication can be performed by connecting the information processing device 100 to a computer network such as the Internet, an intranet, an extranet, a PAN (Personal Area Network), a LAN, a CAN (Campus Area Network), a MAN (Metropolitan Area Network), a WAN (Wide Area Network), or a GAN (Global Area Network). In the case where a plurality of communication methods are used, a plurality of antennas for the communication methods may be included.

The communication module 103 is provided with a high frequency circuit (RF circuit), for example, to transmit and receive an RF signal. The high frequency circuit is a circuit for performing mutual conversion between an electromagnetic signal and an electric signal in a frequency band that is set by national laws to perform wireless communication with another communication apparatus using the electromagnetic signal. As a practical frequency band, several tens of kilohertz to several tens of gigahertz are generally used. A structure can be employed in which the high frequency circuit connected to an antenna includes a high frequency circuit portion compatible with a plurality of frequency bands and the high frequency circuit portion includes an amplifier, a mixer, a filter, a DSP, an RF transceiver, or the like. In the case of performing wireless communication, it is possible to use, as a communication protocol or a communication technology, a communications standard defined by the 3GPP (Third Generation Partnership Project) (registered trademark), such as LTE (Long Term Evolution) (registered trademark), LTE-Advanced compatible with the fourth-generation mobile communication system, or the fifth-generation mobile communication system (5G), a communications standard defined by IEEE (Institute of Electrical and Electronics Engineers) (registered trademark), such as Wi-Fi (registered trademark) or Bluetooth (registered trademark), or the like.

The communication module 103 may have a function of connecting the information processing device 100 to a telephone line. The communication module 103 may include a tuner for generating a video signal, which is to be output to the display module 104, from airwaves received by the antenna.

The display module 104 includes a display panel, a display controller, a source driver, a gate driver, and the like. An image can be displayed on a display surface of the display panel. The display module 104 may further include a projection portion (screen) to employ a method in which an image displayed on the display surface of the display panel is projected on the screen. In that case, when a material that transmits visible light is used for the screen, an AR device in which a displayed image is superimposed on a background image can be obtained.

As a display element that can be used for the display panel, a display element such as a liquid crystal element, an organic EL element, an inorganic EL element, an LED element, a microcapsule, an electrophoretic element, an electrowetting element, an electrofluidic element, an electrochromic element, or a MEMS element can be used.

A touch panel having a touch sensor function can be used as the display panel. In that case, the display module 104 includes a touch sensor controller, a sensor driver, and the like. As the touch panel, an on-cell touch panel or an in-cell touch panel in which a display panel and a touch sensor are combined is preferable. The on-cell or in-cell touch panel can be thin and lightweight. The on-cell or in-cell touch panel has fewer components and can therefore reduce cost.

The fingerprint sensor module 111 has a function of acquiring information on the user's fingerprint. The fingerprint sensor module 111 can include a sensor and a sensor controller. In the fingerprint sensor module 111, a variety of sensors such as an optical type fingerprint sensor utilizing visible light, infrared light, or the like, a capacitive type fingerprint sensor, and a surface acoustic wave type fingerprint sensor can be used as the sensor.

The acceleration sensor module 112 has a function of measuring acceleration and can sense the attitude of the device. The acceleration sensor module 112 can include, for example, an acceleration sensor of a capacitive type, a piezo resistance type, a heat detection type, or the like and a sensor controller. Alternatively, a gyroscope sensor may be included instead of an acceleration sensor.

The camera module 113 can include an imaging element and a controller. A still image or a moving image can be captured by a push of the physical button 115 or by the operation of the touch panel of the display module 104, for example. The captured image or video data can be stored in the memory module 102. The image or the video data can be processed in the arithmetic portion 101. The camera module 113 may use the lighting module 124 as a light source for capturing images. For example, a lamp such as a xenon lamp, a light-emitting element such as an LED or an organic EL, or the like can be used as the lighting module 124. Alternatively, light emitted from the display panel included in the display module 104 may be used as the light source for capturing images. In that case, light of various colors besides white may be used for capturing images.

The GPS module 114 can include an antenna and a receiving circuit that receives a GPS signal. With the GPS module 114, the current positional information can be accurately acquired. With the communication module 103, the positional information can be acquired through wireless LAN access points or the positional information can also be estimated from the distance between the device and a mobile phone base station.

As the physical button 115, a button related to functions such as power on, power off, volume control, and input, selection, determination, etc. of numbers or characters can be used. The function of returning the device from the sleep mode or turning the device to the sleep state by operation of the physical button 115 may be included.

The sensor module 116 includes a sensor unit and a sensor controller. The sensor controller converts the input from the sensor unit into a control signal and outputs it to the arithmetic portion 101 via the bus line 110. The sensor controller may handle errors made by the sensor unit or may calibrate the sensor unit. Note that the sensor controller may include a plurality of controllers which control the sensor unit.

The sensor unit included in the sensor module 116 preferably includes a photoelectric conversion element that detects visible light, infrared rays, ultraviolet rays, or the like and outputs the detection intensity thereof. In that case, the sensor unit can be called an image sensor unit.

The sensor module 116 preferably includes, in addition to the sensor unit, a light source emitting visible light, infrared rays, or ultraviolet rays. In particular, in the case where the sensor module 116 is used for detecting part of the user's face, including a light source emitting infrared rays enables an image to be captured with high sensitivity without making the user feel the glare.

The sensor module 116 may include a variety of sensors which have a function of measuring force, displacement, position, speed, acceleration, angular velocity, rotational frequency, distance, light, liquid, magnetism, temperature, a chemical substance, a sound, time, hardness, electric field, current, voltage, electric power, radiation, flow rate, humidity, gradient, oscillation, smell, or infrared rays.

The sound module 121 includes an audio input portion, an audio output portion, a sound controller, and the like. The audio input portion includes a microphone, an audio input connector, or the like, for example. The audio output portion includes a speaker, an audio output connector, or the like, for example. The audio input portion and the audio output portion are connected to the sound controller, and are connected to the arithmetic portion 101 via the bus line 110. Audio data input to the audio input portion is converted into a digital signal in the sound controller and then processed in the sound controller and the arithmetic portion 101. By contrast, the sound controller generates an analog audio signal audible to a user in response to instructions from the arithmetic portion 101 and outputs it to the audio output portion. To the audio output connector of the audio output portion, an audio output device such as earphones, headphones, or a headset can be connected and a sound generated in the sound controller is output to the device.

The vibration module 122 can include a vibrating element and a vibration controller for controlling the vibrating element. As the vibrating element, an element capable of converting an electric signal or a magnetic signal into vibration, such as a vibration motor (eccentric motor), a resonant actuator, a magnetostrictive element, or a piezoelectric element can be used.

The vibration module 122 can vibrate the vibrating element with a variety of vibration patterns by controlling the number of vibrations, the amplitude, vibration time, and the like of the vibrating element in response to instructions from the arithmetic portion 101.

The fragrance module 123 can include an air freshener, a heating device for applying heat to the air freshener or a vibration device for applying vibration, and a controller that controls the device. The air freshener is preferably replaceable so that the user can freely select it to meet the user's preference. A liquid, gel, or solid air freshener can be used.

The fragrance module 123 can control the amount of scent from the air freshener in response to an instruction from the arithmetic portion 101. When two or more kinds of air fresheners can be included, different kinds of scent can be selected or two or more kinds of scent can be combined and diffused.

The lighting module 124 can include a lighting tool and a lighting controller. As the lighting tool, a variety of lighting devices such as a light bulb, a fluorescent lamp, and a lighting panel in which organic EL elements or LED elements are arranged in a planar manner or a belt-like manner can be used. In particular, a lighting device capable of changing the chromaticity and the illuminance is preferably used.

The lighting module 124 can control the illuminance and the color tone of the lighting with the use of the lighting controller in response to an instruction from the arithmetic portion 101.

The battery module 105 can include a secondary battery and a battery controller. Typical examples of the secondary battery include a lithium-ion secondary battery and a lithium-ion polymer secondary battery. The battery controller can have a function of supplying power accumulated in a battery to the components, a function of receiving power supplied from the outside and charging the battery, and a function of controlling the charging operation in response to the charge state of the battery, for example. The battery controller can include a BMU (Battery Management Unit), for example. The BMU collects data on cell voltage or cell temperatures of the battery, monitors overcharge and overdischarge, controls a cell balancer, handles a deterioration state of the battery, calculates the remaining battery power level (State Of Charge: SOC), and controls detection of a failure, for example.

Examples of the external interface 106 include an external port which is provided on the information processing device 100 and to which an external device can be connected.

The external port included in the external interface 106 can be connected to a device, e.g., an input means such as a keyboard or a mouse, an output means such as a printer, or a storage means such as an HDD, through a cable. A USB terminal is a typical example. As the external port, a LAN connection terminal, a digital broadcast-receiving terminal, an AC adaptor connection terminal, or the like may be provided. Without limitation to wire communication, a transceiver for optical communication using infrared rays, visible light, ultraviolet rays, or the like may be provided.

The above is the description of the hardware structure of the information processing device 100.

At least part of this embodiment can be implemented in combination with the other embodiment described in this specification as appropriate.

REFERENCE NUMERALS

10: system, 10A: electronic device, 11: authentication means, 12: authentication means, 13: data acquisition means, 13A: acceleration sensor, 14: data retention means, 20: data group, 21: data, 22: data, 50: user, 50X: user, 51: eye, 51X: eye, 55: electronic device, 56: wearable device, 100: information processing device, 101: arithmetic portion, 102: memory module, 103: communication module, 104: display module, 105: battery module, 106: external interface, 110: bus line, 111: fingerprint sensor module, 112: acceleration sensor module, 113: camera module, 114: GPS module, 115: physical button, 116: sensor module, 121: sound module, 122: vibration module, 123: fragrance module, 124: lighting module

The invention claimed is:

1. An authentication system for an electronic device comprising an authentication means, a data acquisition means, and a data retention means comprising a memory element, wherein the data retention means is configured to accumulate first data related to a state of the electronic device being used by a first user registered in advance and generating a first data group comprising a plurality of pieces of the first data, wherein the data acquisition means is configured to acquire second data related to a state of the electronic device being used by a second user operating the electronic device, wherein the authentication means is configured to authenticate the second user as the first user on the basis of the first data group and the second data, is configured to set the electronic device to a locked state when the second user is not authenticated, and is configured to maintain a login state of the electronic device and to output the second data to the data retention means when the second user is authenticated, wherein the data retention means is configured to update the first data group by deleting the first data included in the first data group and by adding the second data into the first data group when the second data is output from the authentication means, wherein the authentication means is configured to perform an anomaly detection on the basis of inference using a neural network, wherein the neural network is configured to generate a new learning model or update an existing learning model, when the first data group is updated using the second data, wherein each of the first data and the second data comprises information on a tilt angle of the electronic device and information on a distance between an eye and the electronic device, wherein the tilt angle of the electronic device is measured using an acceleration sensor provided in the data acquisition means, and wherein the distance between the eye and the electronic device is measured by a ranging method using infrared light.

2. The authentication system for an electronic device according to claim 1,
wherein the first data and the second data comprise one or more of attitude information of the electronic device, information on a position of a hand touching the electronic device, and positional information.

3. The authentication system for an electronic device according to claim 1,
wherein the first data group comprises one or more of an activation history, an activation time, an operating time, setting information, and an operating history of application software and an order of starting two or more pieces of application software.

4. An authentication system for an electronic device, comprising a first authentication means comprising a sensor, a second authentication means, a data acquisition means, and a data retention means,
wherein the data retention means is configured to accumulate first data related to a state of the electronic device being used by a first user registered in advance and generating a first data group comprising a plurality of pieces of the first data,
wherein the first authentication means is configured to authenticate a second user operating the electronic device as the first user and is configured to change a locked state of the electronic device into a login state when the second user is authenticated,
wherein the data acquisition means is configured to acquire second data related to a state of the electronic device being used by the second user when the electronic device is in the login state,
wherein the second authentication means is configured to authenticate the second user as the first user on the basis of the first data group and the second data and is configured to set the electronic device to the locked state when the second user is not authenticated, and is configured to maintain the login state of the electronic device and to output the second data to the data retention means when the second user is authenticated,
wherein the data retention means is configured to delete the oldest first data of the plurality of pieces of the first data included in the first data group,
wherein a frequency at which the second authentication means outputs the second data to the data retention means is adjusted on the basis of time information of the plurality of pieces of the first data in the first data group,
wherein the second authentication means is configured to perform an anomaly detection on the basis of inference using a neural network,
wherein the neural network is configured to generate a new learning model or update an existing learning model, when the oldest first data of the plurality of pieces of the first data included in the first data group is deleted and the second data is added to the first data group,
wherein each of the first data and the second data comprises information on a tilt angle of the electronic device and information on a distance between an eye and the electronic device,
wherein the tilt angle of the electronic device is measured using an acceleration sensor provided in the data acquisition means, and wherein the distance between the eye and the electronic device is measured by a ranging method using infrared light.

5. The authentication system for an electronic device according to claim 4,
wherein the first data and the second data comprise one or more of attitude information of the electronic device, information on a position of a hand touching the electronic device, and positional information.

6. The authentication system for an electronic device according to claim 4,
wherein the first data group comprises one or more of an activation history, an activation time, an operating time, setting information, and an operating history of application software and an order of starting two or more pieces of application software.

7. The authentication system for an electronic device according to claim 4,
wherein the first authentication means comprises any one or more of face authentication, fingerprint authentication, vein authentication, voiceprint authentication, iris authentication, cord input authentication, and pattern input authentication.

8. An electronic device comprising:
a display panel comprising a display element, the display panel being configured to display an image;
a first authentication means;
a second authentication means;
a data acquisition means; and
a data retention means comprising a memory element,
wherein the first authentication means is configured to verify whether a user operating the electronic device is an authentic user by comparing first data stored in the data retention means with second data comprising data on the user operating the electronic device,
wherein the first authentication means is configured to unlock the electronic device, when the second data matches the first data,
wherein each of the first data and the second data comprises at least one of data on a face, a fingerprint, a vein, a voice, and an iris,
wherein, in an unlocked state of the electronic device, the second authentication means is configured to verify whether the user operating the electronic device is the authentic user on the basis of third data retained in the data retention means and fourth data acquired by the data acquisition means,
wherein, in the unlocked state of the electronic device, the second authentication means is configured to keep the unlocked state, when the fourth data matches the third data,
wherein, in the unlocked state of the electronic device, the second authentication means is configured to put the electronic device into a locked state, when the fourth data does not match the third data,
wherein the third data comprises data on a habit of the authentic user,
wherein the fourth data comprises data on a habit of the user operating the electronic device,
wherein each of the data on the habit of the authentic user and the data on the habit of the user operating the electronic device comprises at least one of information on a position of a hand or a finger touching the electronic device, positional information of the electronic device, a tilt angle of the electronic device, moving speed of the electronic device, activation time of the electronic device, activation history of application software, the starting order of two or more application software, activation frequency of a specific application software, internet browsing history, speed of character entry operation on a touch panel included in the electronic device, and speed of keyboard typing operation, wherein the data retention means is configured to update the third data by deleting part of the third data and adding the fourth data to the third data, wherein each of the data on the habit of the authentic user and the data on the habit of the user operating the electronic device comprises information on the tilt angle of the electronic device and information on a distance between an eye and the electronic device, wherein the tilt angle of the electronic device is measured using an acceleration sensor provided in the data acquisition means, and wherein the distance between the eye and the electronic device is measured by a ranging method using infrared light.

9. The electronic device according to claim 8, wherein the second authentication means is configured to perform an anomaly detection on the basis of inference using a neural network, and wherein the neural network is configured to generate a new learning model or update an existing learning model, when the third data is updated with the fourth data.

10. The electronic device according to claim 8, wherein, in the unlocked state of the electronic device, after a predetermined period of time has elapsed since the second authentication means has verified that the third data matches the fourth data, the data acquisition means acquires fifth data and outputs the fifth data to the second authentication means, and wherein the fifth data comprises data on a habit of the user operating the electronic device.

\* \* \* \* \*